Oct. 17, 1967     F. H. WRIGHT     3,348,109

ELECTRIC MOTOR WINDING ARRANGEMENTS

Filed May 1, 1964     5 Sheets-Sheet 1

Inventor:
Floyd H. Wright,
by Henry J. Moranick
Attorney.

United States Patent Office 3,348,109
Patented Oct. 17, 1967

3,348,109
ELECTRIC MOTOR WINDING ARRANGEMENTS
Floyd H. Wright, Fort Wayne, Ind., assignor to General Electric Company, a corporation of New York
Filed May 1, 1964, Ser. No. 364,105
8 Claims. (Cl. 318—220)

My invention relates to alternating current motors, more particularly to an improved winding arrangement for single and polyphase induction motors adaptable for use in conjunction with semiconductor switching networks energized from a direct current source.

In some motor applications, such as in truck refrigeration systems and the like, it is desirable that an alternating current motor, such as an induction motor, be operated from a D.C. source. Heretofore in such applications a direct current series wound motor has been used. An inherent disadvantage in using such a series wound motor in a refrigeration system is that it cannot be hermetically sealed in the compressor unit since brushes are employed and must be periodically serviced. Also, in certain aircraft applications, it is desirable to employ induction motors rather than direct current type of motors utilizing brushes.

Although the use of semiconductor inverters has been proposed for the operation of induction motors from a D.C. source, conventional alternating motors when used with such inverters have posed problems. Conventional motors when used with semiconductor inverters require relatively bulky and costly transformers. In many instances, the transformers cost as much, if not more than the motor. It is desirable not only from a weight standpoint but from a cost standpoint to eliminate the need for a transformer and to operate the induction motor directly from the switching network of the inverter.

Accordingly, a general object of the present invention is to provide an improved motor winding arrangement for use in conjunction with a semiconductor switching network energized from a D.C. source to operate an alternating current motor.

It is a specific object of the present invention to provide an improved winding arrangement for a single phase or polyphase induction motor that can be operated directly from the switching network of a parallel inverter without need for a separate transformer between the network and the motor.

In accordance with one form of my invention I have provided a new and improved motor winding arrangement for use in conjunction with a semiconductor switching network energized from a direct current source for supplying current to the motor in a predetermined time-sequence relation. The winding arrangement includes a first and second main winding positioned in slots of the magnetic core of the motor to form two primary magnetic running poles. Preferably, the first and second main windings are comprised of bifilar wound coils. When energized, the first main winding produces one instantaneous polarity of a pair of the primary magnetic running poles, and the second main winding produces the opposite instantaneous polarity of the pair of the primary magnetic running poles.

A tap connection is provided to electrically join the first and second main windings in autotransformer relation. Leads are also brought out from the windings for connection in circuit with the switching network so that the first and second main windings are alternately energized through the tap connection to cause the polarity of the primary magnetic poles to alternate for operating the motor. In addition, the first and second main windings alternately serve as a primary of an autotransformer to provide the step up in voltage where needed. In semiconductor switching networks employing silicon controlled rectifiers, the voltage step up may be used to aid in the commutation of the rectifiers.

According to another aspect of the invention, the improved winding arrangement may be used in a polyphase induction motor such as a two phase induction motor. In a two phase induction motor two pairs of phase windings are positioned in the slots of the magnetic core, one pair of windings being electrically displaced from the other pair by ninety electrical degrees. Each pair of phase windings produces a pair of primary magnetic running poles. Further, the phase windings of each pair of windings are connected in autotransformer relation by a tap connection and have leads brought out for connection with the semiconductor switching network so that there is an alternate energization of each of the phase windings to cause the polarity of the magnetic poles to alternate.

The improved winding arrangement makes it possible to operate an alternating current motor directly from a semiconductor switching network without need for a separate transformer between the motor and the network. As a result reduction in cost and weight can be achieved in a system for operating an alternating current motor from a D.C. source.

The subject matter which I regard as my invention is set forth in the appended claims. The invention itself, however, together with further objects and advantages thereof may be best understood by referring to the following description taken in connection with the accompanying drawings in which:

Figure 1:
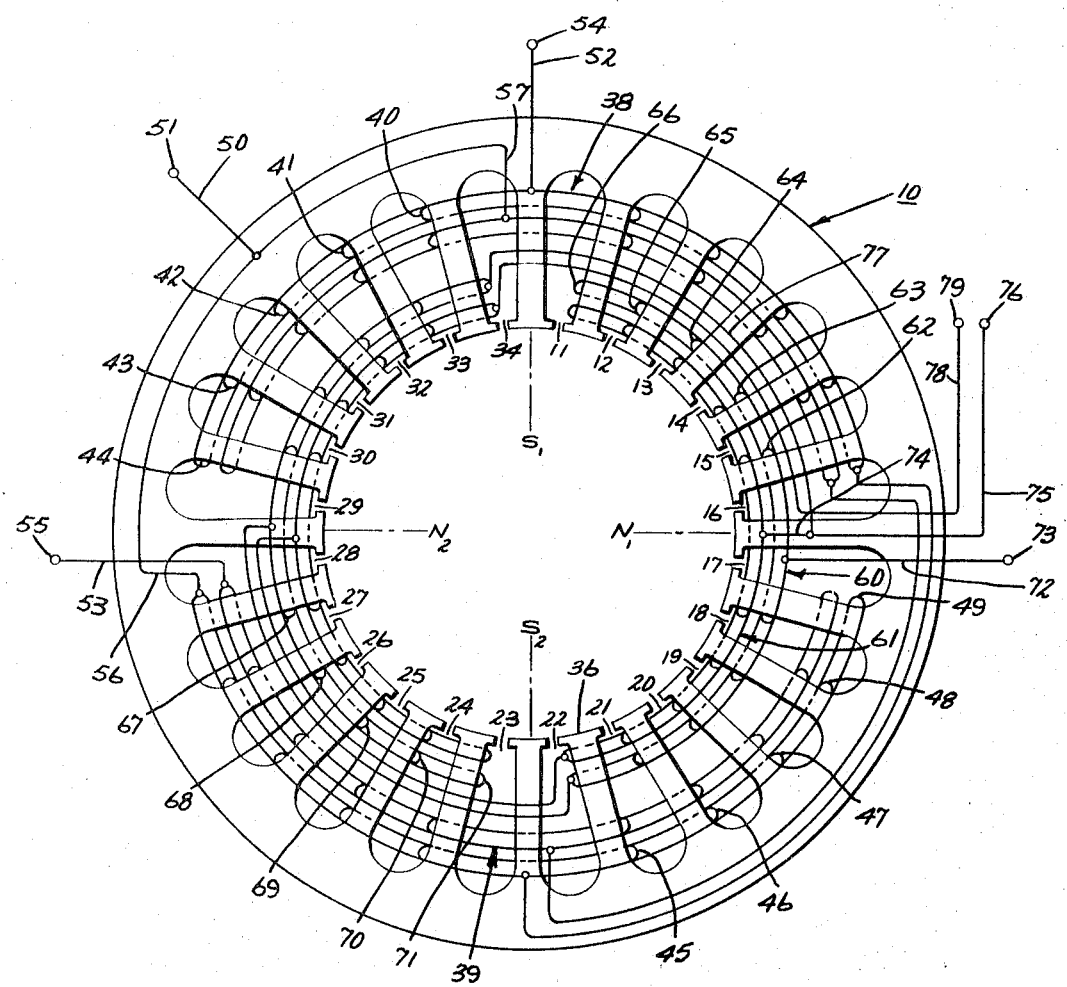
FIGURE 1 is a schematic end view of a stator core member of a two phase induction motor embodying one form of the improved winding arrangement of the invention.

Referring now in more detail to FIGURE 1 of the drawings, I have illustrated one form of my invention embodied with a two phase induction motor. The stator member 10 is formed of a laminated core having twenty-four coil accommodating slots numbered from 11 through 34 inclusive in the drawing. The slots define a corresponding number of teeth therebetween, each of the teeth having an entrance and communication with a rotor receiving bore 36 formed by the ends of the teeth.

A first pair of phase windings 38 and 39 are arranged in slots to provide two primary magnetic running poles. The phase winding 38 produces one instantaneous polarity of the primary magnetic running poles having radial pole centers designed at $S_1$ and $S_2$. The opposite instantaneous polarity is produced by the phase winding 39. Thus, as the phase windings 38 and 39 are alternately energized, the polarity of the two primary magnetic running poles with radial pole centers $S_1$ and $S_2$ will alternate. The pole with radial pole center $S_1$ is preferably comprised of a group of five concentric bifilar wound coils 40, 41, 42, 43, 44 spanning 3, 5, 7, 9 and 11 teeth, respectively. The other pole with the radial pole center $S_2$ is formed by five concentric bifilar wound coils 45, 46, 47, 48 and 49, which are identically distributed in diammetrically opposed slots. The two phase windings 38 and 39 are joined in autotransformer relation and connected with a tap connection 50 having a terminal 51. The start lead 52 of phase winding 38 and the finish lead 53 of phase winding 39 are brought out and electrically connected with terminals 54 and 55. The finish lead 56 of phase winding 38 and start lead 57 of phase winding 39 are joined with the tap connection 50.

As is best seen in FIGURE 1, the second pair of phase windings 60 and 61 are displaced ninety electrical degrees from the phase windings 38 and 39. The phase windings 60 and 61 are positioned in slots to provide the primary magnetic running poles with radial pole centers designated as $N_1$ and $N_2$. The phase winding 60 produces one instantaneous polarity of the magnetic poles while phase winding 61 produces the opposite instantaneous polarity as the windings 60 and 61 are alternately energized in predetermined time-phase relation.

The pole with the radial pole center $N_1$ is comprised of a group of five concentric bifilar wound coils 62 63, 64, 65 and 66 spanning 3, 5, 7, 9 and 11 teeth, respectively. The other pole with the radial pole center $N_2$ is similarly formed by five essentially concentric bifilar wound coils 67, 68, 69, 70 and 71, which are identically distributed in diametrically opposed slots. In accordance with the improved winding arrangement the start lead 72 of phase winding 60 is connected in circuit with a terminal 73 and the start lead 74 of phase winding 61 is connected in circuit with the tap connection 75 and tap terminal 76. The finish lead 77 of phase winding 60 is also joined to the tap connection 75 while the finish lead 78 of phase winding 61 is connected to terminal 79. The precise relationship of the number of turns in each coil will, of course, differ with the size and type of motor. In the illustrative embodiment of the invention each group of coils defining a pole included 3, 5, 7, 8 and 9 turns per coil wound around 3, 5, 7, 9 and 11 teeth, respectively.

From the foregoing description it will be apparent that the improved bifilar winding arrangement provides two circuits for each phase, the windings of which are inductively coupled. As will hereinafter be more fully explained, when the windings are alternately energized from switching networks, one of the windings of each pair of phase windings alternately functions as the primary winding of a transformer to produce a voltage across the terminals 73, 79 and 54, 55 that is greater than the D.C. source from which the switching networks are energized. With the improved winding arrangement the inversion of the current takes place in the motor, and the motor, in effect, becomes a part of a two phase inverter.

Figure 2:
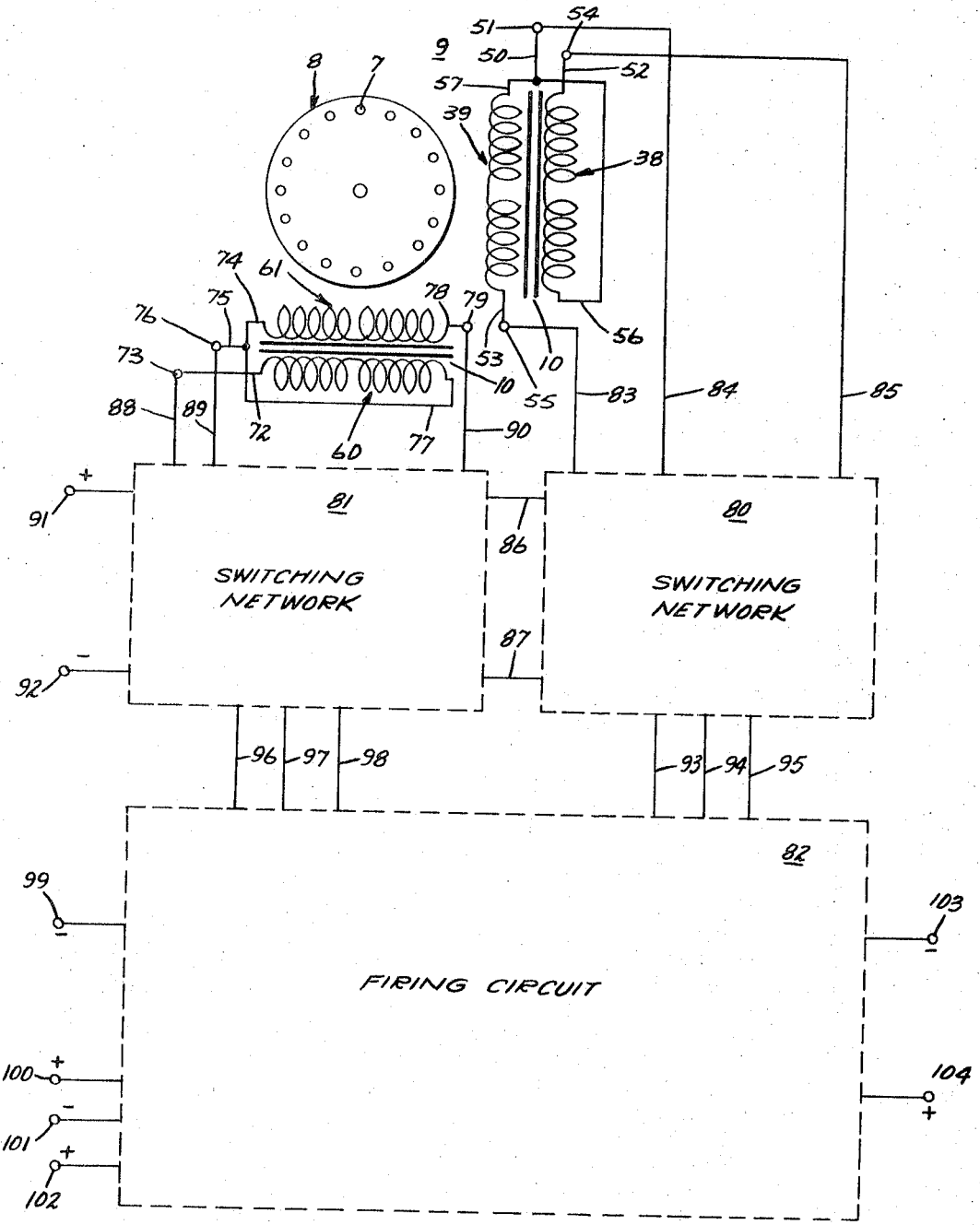
FIGURE 2 is a schematic circuit diagram of the motor of FIGURE 1 shown connected in circuit for operation with a pair of switching networks and a firing circuit, the switching networks and firing circuit being shown in block diagram form.

Having more specific reference now to FIGURE 2, I have shown therein a schematic representation of the motor 9 with its associated switching networks 80, 81 and firing circuit 82 shown as dashed rectangles. In the illustrated embodiment of the invention the motor 9 included a conventional squirrel cage rotor 8 having conductors 7 extending therethrough and being short circuited together at each end of the rotor 8. It will be understood, of course, that the rotor 8 is centrally and rotatably supported within a bore defined by the stator member 10.

The three motor terminals 55, 51, and 54 are connected in circuit with leads 83, 84 and 85 of switching network 80. As will hereinafter be more fully explained lead 84 connected to the center tap terminal 51 is joined in electrical circuit with the positive side of a D.C. source (not shown) connected across lines 86 and 87. Leads 83 and 85 connected to the motor terminals 55 and 54 are alternately connected in predetermined time-phase relation by switching network 80 to the grounded side of a D.C. source or a suitable ground so that the phase windings 38 and 39 are alternately energized.

The motor terminals 73, 76 and 79 of the phase windings 60, 61 are connected in circuit with leads 88, 89 and 90 of the second switching network 81. In the illustrated embodiment of the invention the terminals 91 and 92 of switching network 81 were provided for connection to a 90 volt D.C. supply from which the motor 9 was operated. Lines 86 and 87 of switching network 80 were also connected in circuit with the D.C. supply through switching network 81. The switching networks 80 and 81 are coupled with firing circuit 82 by means of leads 93, 94, 95 and 96, 97, 98. The firing circuit 82 is adapted to be energized from a D.C. source, which in the illustrated embodiment of the invention was a 20 volt D.C. supply. The terminals 99, 100, 101, 102, 103 and 104 of the firing circuit 82 are adapted to be connected to the positive and negative sides of a D.C. supply as is shown by the positive and negative signs adjacent to the terminals.

Figure 3:
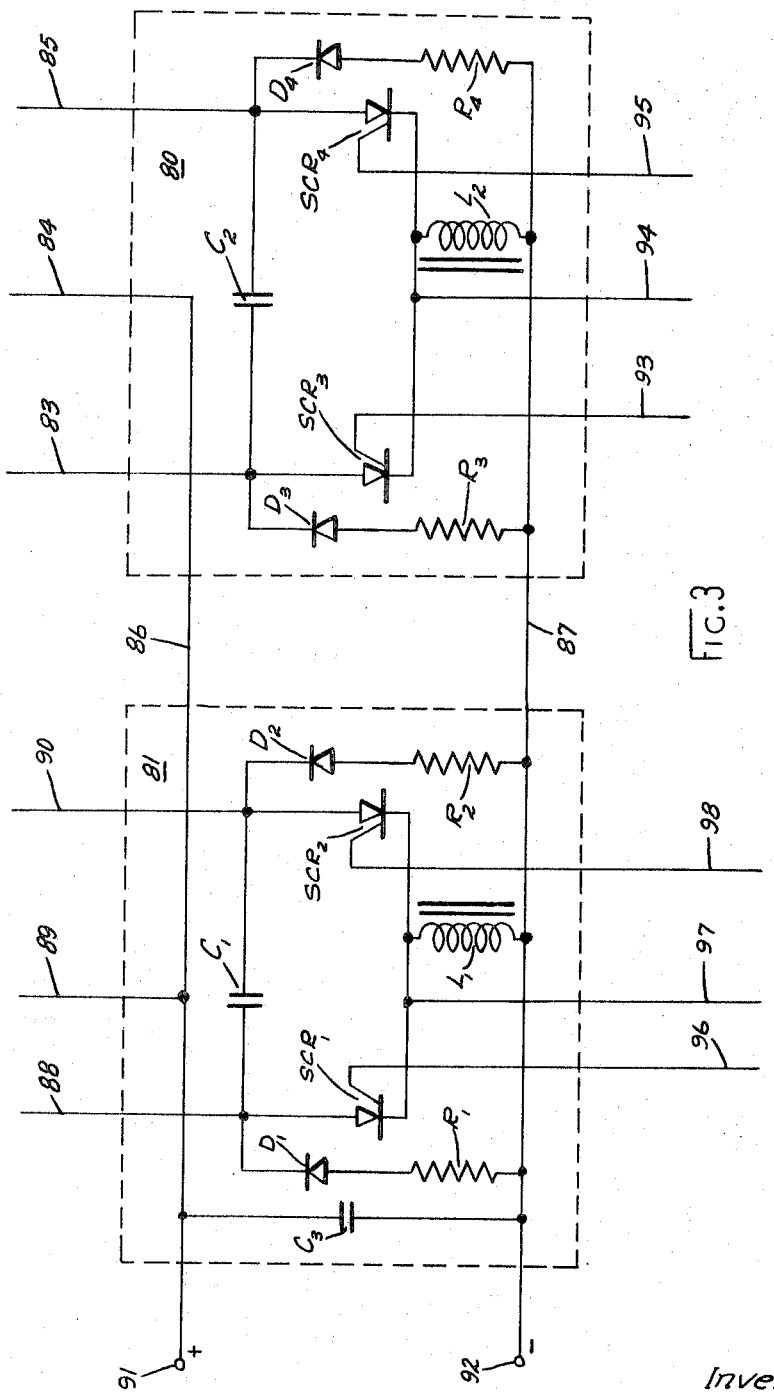
FIGURE 3 is a schematic circuit diagram of the switching networks shown as block diagrams in FIGURE 2.

Referring now more specifically to FIGURE 3, I have illustrated therein a schematic circuit diagram of the switching networks used in the exemplification of the invention to energize the phase windings 38, 39, 60 and 61 of the two phase motor 9. In the exemplification of the invention shown in FIGURES 2, 3 and 4, the improved motor winding arrangement was operated in conjunction with the switching networks 80, 81 and firing circuit 82 as a McMurray-Bedford type of parallel inverter. The McMurray-Bedford inverter is described at pages 152–170 of the General Electric Silicon Controlled Rectifier Manual, second edition (1961), published by the General Electric Company Rectifier Components Department, Auburn, N.Y.

It will be noted that both switching networks 80 and 81 are energized from the terminals 91 and 92 of network 81. The leads of 84 and 89 of the switching networks 80, 81 connected to the center tap terminals of the motor are joined in circuit with the input terminal 91 adapted for connection to the positive side of the D.C. source. Each of the switching networks includes a pair of controlled rectifiers $SCR_1$, $SCR_2$ and $SCR_3$, $SCR_4$, respectively, which connect the leads 88, 90 and 83, 85 to the grounded or negative terminal 92 through the inductors $L_1$ and $L_2$. As the controlled rectifiers $SCR_1$ and $SCR_2$ are alternately triggered into conduction by the firing circuit, the phase windings 60 and 61 (see FIGURE 2) are alternately energized. Similarly, as controlled rectifiers $SCR_3$ and $SCR_4$ are alternately triggered into conduction in proper time-phase relation by the firing circuit, the phase windings 38 and 39 are alternately energized.

Capacitors $C_1$ and $C_2$ are commutating capacitors and in conjunction with inductors $L_1$ and $L_2$ provide a pulse to back bias the conducting controlled rectifier and turn it off. Feedback diodes $D_1$, $D_2$, $D_3$ and $D_4$ connected in inverse parallel relation with the controlled rectifiers $SCR_1$, $SCR_2$, $SCR_3$ and $SCR_4$ serve to limit the voltage across the windings respectively. Resistors $R_1$, $R_2$, $R_3$ and $R_4$ are provided in series with the feedback diodes $D_1$, $D_2$, $D_3$ and $D_4$ to cause most of the commutating energy to be dissipated in these resistors rather than in the controlled rectifiers and the winding resistance of inductors $L_1$ and $L_2$. A capacitor $C_3$ may be connected in circuit across the input terminals 91 and 92 where the D.C. source is not capable of receiving energy.

Three leads 96, 97, and 98 are provided to connect controlled rectifiers $SCR_1$ and $SCR_2$ with a bistable multivibrator 112 of firing circuit 82, and leads 93, 94 and 95 similarly connect controlled rectifiers $SCR_3$ and $SCR_4$ with another bistable multivibrator 113 of firing circuit 82, which will now be more fully described.

Figure 4:
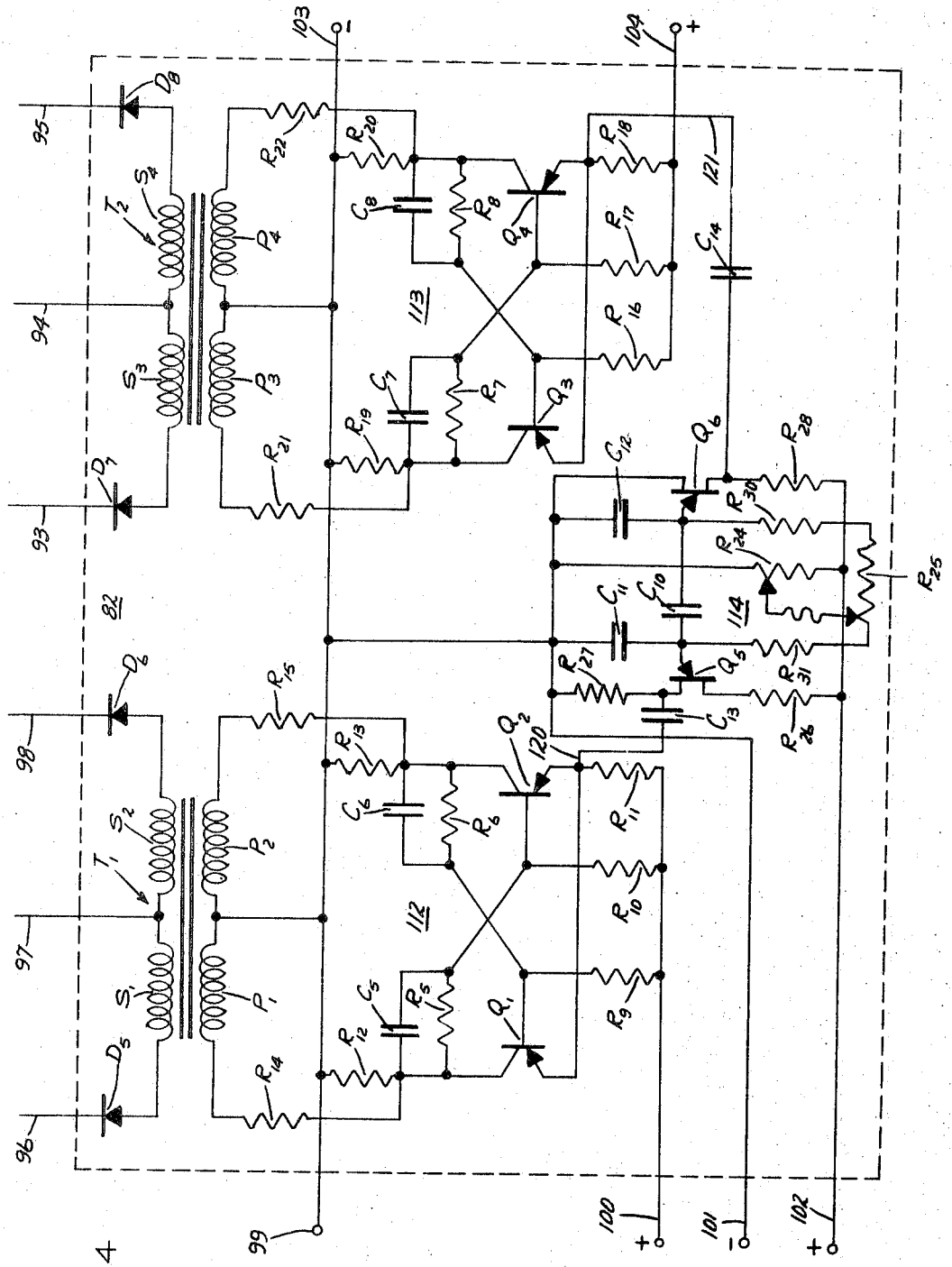
FIGURE 4 is a schematic diagram of the firing circuit shown in block diagram form in the FIGURE 2.

As an exemplification of a suitable firing circuit, I have illustrated in FIGURE 4 a schematic circuit diagram of a firing circuit 82 which is essentially comprised of the pair of multivibrators 112 and 113 triggered by a unijunction transistor oscillator 114 generating alternate pulses. The multivibrator 112 is coupled with the gate-cathode of the controlled rectifiers $SCR_1$ and $SCR_2$ through a step-down transformer $T_1$ having the primary winding portions $P_1$ and $P_2$ and the secondary winding portions $S_1$ and $S_2$. Similarly, a transformer $T_2$ having the primary winding portion $P_3$ and $P_4$, secondary winding portions $S_3$ and $S_4$ provides coupling between the gate and cathode of the controlled rectifiers $SCR_3$ and $SCR_4$. The diodes $D_5$, $D_6$, $D_7$ and $D_8$ in the gate leads 96, 98, 93 and 95 insure a consistent tripping level since a controlled rectifier is not fired until the gate signal exceeds the forward voltage drop of the diode and the gate firing requirements are met.

It will be seen in FIGURE 4 that the multivibrator 112 includes a pair of PNP transistors $Q_1$ and $Q_2$, a pair of cross coupling capacitors $C_5$ and $C_6$, a pair of cross coupling resistors $R_5$, $R_6$ and resistors $R_9$, $R_{10}$, $R_{11}$, $R_{12}$, $R_{13}$, $R_{14}$ and $R_{15}$. The time constant of the capacitor $C_5$ and the resistor $R_5$ essentially determines the fall time from conduction to cut off of transistor $Q_1$ while the time constant of capacitor $C_6$ and $R_6$ determines the fall time of the transistor $Q_2$. Capacitors $C_5$ and $C_6$ also rapidly couple changing voltages to the bases of the transistors $Q_1$ and $Q_2$ and thereby insure rapid switching of the transistors. Resistors $R_{10}$ and $R_5$ and $R_{12}$ function as voltage divider network for transistor $Q_1$. Similarly, resistors $R_9$, $R_6$ and $R_{13}$ function as a voltage divider network for transistor $Q_2$. Resistor $R_{11}$ permits a positive bias at the base of the non-conducting transistor to effect its turn-off. Resistors $R_{14}$ and $R_{15}$ are used to reduce the voltage across the transformer $T_1$ and may be eliminated.

Bistable multivibrator 113 is coupled with the switching network 80 through the transformer $T_2$ and has essentially the same circuit configuration as the other multivibrator 112. Multivibrator 113 includes a pair of PNP transistors $Q_3$ and $Q_4$, a pair of cross coupling capacitors $C_7$, $C_8$, a pair of cross coupling resistors $R_7$, $R_8$ and resistors $R_{16}$, $R_{17}$, $R_{18}$, $R_{19}$, $R_{20}$, $R_{21}$ and $R_{22}$. As in the other multivibrator, the time constant of the capacitor $C_7$ and resistor $R_7$ determines the fall time of the transistor $Q_3$ and the time constant of the capacitor $C_8$ and the resistor $R_8$ determines the fall time of the transistor $Q_4$. The resistors $R_{17}$, $R_7$ and $R_{19}$ function as a voltage divider network for the transistor $Q_3$ and similarly resistors $R_{16}$, $R_8$ and $R_{20}$ serve as a voltage divider network for transistor $Q_4$. Resistor $R_{18}$ insures that a positive bias will be applied at the base of the nonconducting transistor. To reduce the voltage across the transformer windings $P_3$ and $P_4$ the resistors $R_{21}$ and $R_{22}$ may be used.

The bistable multivibrators 112 and 113 are triggered by pulses supplied at input leads 120 and 121 by the unijunction transistor oscillator 114. It will be appreciated that when one of the multivibrators is triggered by a pulse from the oscillator 114, the multivibrator switches to its other stable state where it remains until triggered by another pulse. Each flip-flop of the multivibrators results in a change of state of the pair of controlled rectifier to which the multivibrator is coupled. The conducting rectifier is turned off and the nonconducting rectifier is turned on.

Continuing with the description of the firing circuit 82 shown in FIGURE 4, it will be seen that the unijunction transistor oscillator 114 is comprised of a pair of unijunction transistors $Q_5$ and $Q_6$. In effect, two unijunction transistor relaxation oscillators are coupled together by means of a capacitor $C_{10}$ connected between the emitters of the unijunction transistors $Q_5$ and $Q_6$. The frequency of the pulses supplied at leads 120 and 131 is determined by the values of capacitors $C_{10}$, $C_{11}$ and $C_{12}$, and resistors $R_{24}$, $R_{25}$, $R_{32}$. The resistors $R_{24}$ and $R_{25}$ may be variable in order to allow the time difference between the pulses to be changed. Resistors $R_{26}$, $R_{27}$ are connected respectively with the base-one and base-two electrodes of the unijunction transistor $Q_5$ and similarly resistors $R_{28}$ and $R_{29}$ connected respectively with the base-one and base-two electrodes of the unijunction transistor $Q_6$. The resistors $R_{27}$ and $R_{29}$ serves as temperature stabilizing elements for the unijunction transistors $Q_5$, $Q_6$. The capacitive value of capacitor $C_{10}$ is determined by the required starting conditions, the range over which it may be desired to control the timing, and by circuit stability. In the exemplification of the invention the capacitive values of the capacitors $C_{10}$, $C_{11}$ and $C_{12}$ were equal, and the oscillators were started in approximately the correct timing sequence when the power was applied.

Having reference now to FIGURES 2, 3 and 4, the operation of the motor 9 and its associated switching networks 80, 81 and firing circuit 82 will now be more fully described. With the switching networks 80, 81 and firing circuit 82 energized, the multivibrators 112 and 113 are initially at rest in one of their stable states. Assuming arbitrarily that transistors $Q_1$ and $Q_3$ are conducting and the transistors $Q_2$ and $Q_4$ are nonconducting, it will be seen that the winding portions $P_1$ and $P_3$ of the transformers $T_1$, $T_2$ will be energized. The path of instantaneous current flow through the multivibrator 112 will be from the positive terminal 100 through resistor $R_{11}$, transistor $Q_1$, resistor $R_{14}$, the primary winding portion $P_1$ and to the negative terminal 99. The instantaneous voltage induced in the secondary winding portion $S_1$ is such that the left end of the winding as seen in FIGURE 4 is positive with respect to the center tap. Thus, a positive pulse is applied at the gate of controlled rectifier $SCR_1$, triggering it into conduction. With the controlled rectifier $SCR_1$ conducting, the left end of the phase winding 60, as seen in FIGURE 2, is clamped to ground. Current flow now flows from the positive side of the D.C. power source connected across terminals 91, 92, through lead 89, terminal 76, the phase winding 60, terminal 73, lead 88, controlled rectifier $SCR_1$ (See FIGURE 3) inductor $L_1$, and to the terminal 92 connected with the negative or grounded side of the D.C. source.

At the same instant, the transistor $Q_3$ of the other multivibrator 113 is also in a conducting state. Current flows through the primary portion $P_3$ of the transformer $T_2$ to cause a voltage to be induced across the secondary winding portion $S_3$. A positive voltage is supplied at the gate of the controlled rectifier $SCR_3$ to turn it on thereby clamping phase winding 39 to ground. Current flows from the positive side of the D.C. source, through lead 84, terminal 51, the phase winding 39, terminal 55, lead 83 and to the negative or grounded side of the D.C. source.

When a negative trigger pulse is applied to the emitters of the transistors $Q_1$ and $Q_2$, a flip-flop occurs. Transistor $Q_1$ is turned off and transistor $Q_2$ is now turned on to cause current to flow through the winding portion $P_2$ and turn on controlled rectifier $SCR_2$. Due to the autotransformer action of the phase windings 60, 61, a voltage of approximately twice the magnitude of the source voltage is induced across the commutating capacitor $C_1$. The potential at the top end of the inductor $L_1$, as seen in FIGURE 3, will rise to approximately twice the source voltage. Thus, the commutating capacitor $C_1$ and the inductor $L_1$ cause a reverse bias to be applied across the controlled rectifier $SCR_1$ of sufficient duration to allow it to return to a blocking state.

As the oscillator 114 supplies negative pulses alternately at leads 120 and 121, the multivibrators 112 and 113 are switched from one stable state to the other to turn on the nonconducting one of the controlled rectifiers of the switching networks 81, 82 and to turn off the conducting one of the controlled rectifiers. The switching of the controlled rectifiers alternately energizes phase windings so that a rotating magnetic field is produced, and the motor 9 effectively operates like a conventional two phase induction motor.

At any given instant current flows in one of the windings to both phases of the motor 9 and two distinct magnetic fields 90 degrees apart in time and 90 electrical degrees apart in space are set up by th ephase windings. A resultant magnetic field is produced that is practically constant in magnitude. The flux lines emanating from the rotating field cut the conductors 7 in the squirrel cage rotor 8 thereby inducing current in them. These induced currents react with the revolving magnetic field to cause the squirrel cage rotor 8 to follow this field at a speed slightly less than the speed of the rotating field. As the phase windings alternately come into play, in effect, an alternating voltage is simulated.

Although in this illustrated embodiment of the invention a two phase motor was employed, it will be appreciated that th ebifilar winding arrangement may be used for other polyphase induction motors. It is necessary, of course, in a polyphase induction motor that the space relations of the windings for the different phases in electrical degrees must be the same as the time-phase relations of the currents they carry.

Figure 5:
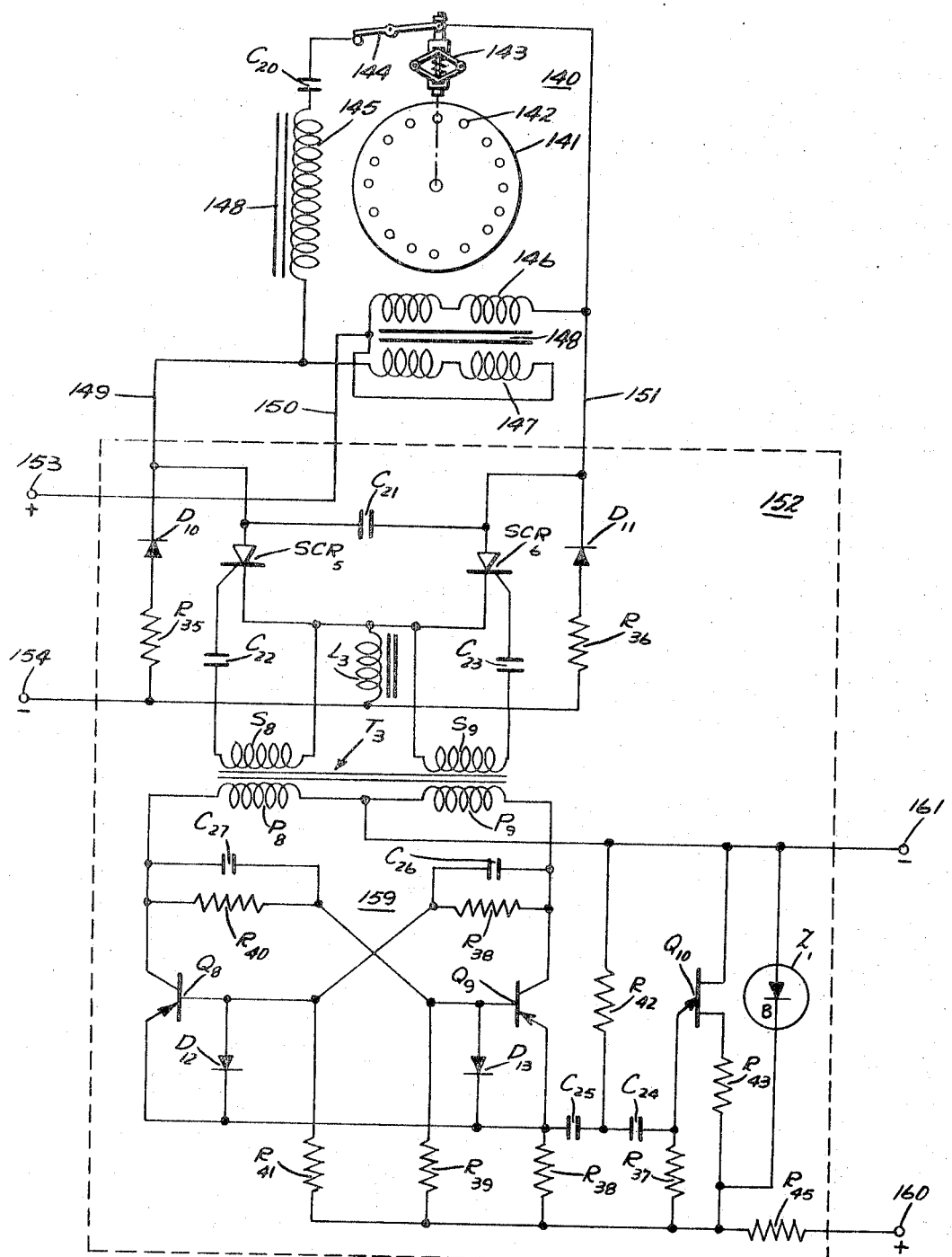
FIGURE 5 is a schematic diagram of a single phase motor embodying another form of the invention and shown connected in circuit with a single phase inverter.

Having more specific reference now to FIGURE 5, I have illustrated therein a motor 140 of the single phase induction type having a rotor 141 with squirrel cage winding conductors 142 extending therethrough and short circuited together at each end by end rings (not shown). A centrifugal mechanism 143, which includes a contact arm 144, is activated by the rotational speed of the rotor 141. When the rotor 141 is at rest or rotating at a speed below a predetermined value, the contact arm 144 is in the position shown so that the capacitor $C_{20}$ and the starting winding 145 are connected in parallel circuit relation with a pair of main field windings 146 and 147 postioned in the slots of a stator member 148. When the speed of rotation of the rotor 141 is above the predetermined value, the centrifugal mechanism 143 will cause the contact arm 144 to pivot and disconnect the start winding 145 and capacitor $C_{20}$ from the circuit.

In this embodiment of the invention, as in the previously described embodiment, the windings 146 and 147 in effect function as a center tap transformer and as the main field winding of an induction motor. The main field windings 146 and 147 are connected in circuit with the leads 149, 150 and 151 of a switching network and firing circuit which are generally identified by reference numeral 152. Each of the windings 146, 147 are comprised of an identical number of coils and are bifilar wound. The start lead of winding 146 and the finish lead of the winding 147 are joined to the lead 150 connected to a terminal 153 adapted for connection to the positive side of the D.C. source. When controlled rectifiers of the $SCR_5$ and $SCR_6$ are alternately switched on and off, the windings 146, 147 are alternately energized.

Continuing with the description of the circuit 152 shown in FIGURE 5, it will be seen that the switching network includes a pair of controlled rectifiers $SCR_5$ and $SCR_6$, a commutating capacitor $C_{21}$, and inductor $L_3$, feedback diodes $D_{10}$, $D_{11}$ and resistors $R_{35}$ and $R_{36}$. A transistor bistable multivibrator 159 is coupled with the controlled rectifiers $SCR_5$ and $SCR_6$ through the transformer $T_3$ to alternately apply firing pulses at the gate-cathode junctions. Capacitors $C_{22}$ and $C_{23}$ in conjunction with the gate-to-cathode impedance of the controlled rectifiers $SCR_5$, $SCR_6$ differentiate the square wave across the secondary winding portions $S_8$ and $S_9$ to provide a square wave voltage for triggering the controlled rectifiers. Two primary winding portions $P_8$ and $P_9$ of transformer $T_3$ are connected in circuit with the collectors of transistors $Q_8$ and $Q_9$. Terminal 160 is provided for connection to the positive side of a direct current source, and a terminal 161 is provided for connection to the negative side of the power source or to a suitable ground.

In the multivibrator 159 PNP transistors $Q_8$ and $Q_9$ are employed in a saturating flip-flop arrangement. A unijunction transistor $Q_{10}$ serves to trigger the flip-flop from one state to the other by providing a negative trigger pulse. This negative pulse is developed across resistor $R_{37}$ and is coupled to the resistor $R_{38}$ by means of capacitor $C_{25}$. Capacitor $C_{25}$ serves as the emitter capacitor of unijunction transistor oscillator. The cross coupling networks include the capacitors $C_{26}$ and $C_{27}$ and the resistors $R_{38}$, $R_{39}$, $R_{40}$ and $R_{41}$. The diodes $D_{12}$ and $D_{13}$ clamp the base electrode of transistors $Q_8$, $Q_9$ to the emitter electrode. The charging rate of the emitter capacitor $C_{25}$ is controlled by resistors $R_{37}$, $R_{42}$ and thereby set the rate at which the flip-flop is triggered. A resistor $R_{42}$ is connected to the base-two electrode of the unijunction transistor $Q_{10}$ and provides temperature stabilization. Through the action of the Zener diode $Z_1$, and resistor $R_{45}$, a regulated D.C. voltage is applied across the unijunction transistor $Q_{10}$.

When terminals 153, 154, 160 and 161 are energized from suitable D.C. source, the multivibrator 159 will assume one of its stable states. Let us assume arbitrarily that the transistor $Q_8$ is in a conducting state and a firing pulse is applied to the gate of controlled rectifier $SCR_5$. When controlled rectifier $SCR_5$ is triggered into conduction, the commutating capacitor $C_{21}$ is charged to a voltage that is greater in magnitude than the voltage of the D.C. source applied across terminals 153, 154 because of the transformer action of the main windings 146 and 147. In the illustrated embodiment of the invention voltage across the capacitor $C_{21}$ was approximately twice the voltage across the input terminals 153, 154. When the charge on the emitter capacitor $C_{24}$ reaches the peak point voltage of the unijunction transistor $Q_{10}$, the unijunction transistor $Q_{10}$ is turned on to thereby cause a negative pulse to be supplied to the emitter of transistor $Q_8$ and $Q_9$ to trigger the flip-flop. Transistor $Q_9$ now conducts and current flows through the primary winding portion $P_9$. The polarity of the voltage induced in the secondary winding portions $S_8$ and $S_9$ is such that controlled rectifier $SCR_6$ is turned on and controlled rectifier $SCR_5$ is turned off. The commutating capacitor $C_{21}$ will maintain a reverse bias across controlled rectifier $SCR_5$ long enough for it to return to a blocking state. With controlled rectifier $SCR_6$ conducting, the main winding 146 is energized. The turn-off of the controlled rectifier $SCR_6$ is accomplished in the same manner as the turn-off of the controlled rectifier $SCR_5$ when the flip-flop of the bistable multivibrator is again triggered.

It will be seen that as the multivibrator flip-flops from one of its stable states to the other, the controlled rectifiers $SCR_5$ and $SCR_6$ are alternately switched on and off. As the controlled rectifiers $SCR_5$ and $SCR_6$ are alternately switched on and off, current from the D.C. source connected across terminals 153 and 154 will flow alternately through the main windings 146, 147 to thereby produce a rotating main field, and the motor 140 essentially operates as an alternating current induction motor.

A principal advantage of the improved motor winding arrangement is that the need for a separate transformer is eliminated when an alternating current motor is operated from a D.C. source. The windings of the motor may be adapted to provide a step-up in the voltage across the motor terminals and also provide the requisite current reversing action to produce an alternating current effect. The improved motor winding arrangement is particularly advantageous when used in conjunction with semiconductor switching devices, such as silicon controlled rectifiers, where the transformer action of the windings can be utilized to provide the step-up in voltage required to facilitate commutation of the semiconductor devices. Preferably, the windings are bifilar wound to allow for good coupling between the two windings when reactive current is flowing in the feedback diodes. Bifilar wound windings provide the advantage that the transient voltages occurring during switching are reduced.

Although in the exemplifications of the invention, the switching devices used were controlled rectifiers, it will be appreciated that the winding arrangements can be used in conjunction with other semiconductor switching devices that can be switched on and off to provide a proper time-phase relation for the current supplied to the phase windings. Further, it will be understood that the improved winding arrangement is readily adaptable to other polyphase induction motors. It will be apparent that many modifications of the invention described herein may be made. It is to be understood, therefore, that I intend by the appended claims to cover all such modifications that fall within the true spirit and scope of the invention.

What I claim as new and desire to secure by Letters Patent of the United States is:

1. In an alternating current motor for operation from a semiconductor switching network energized from a direct current source for supplying current thereto in predetermined time-phase relation, a magnetic core having a plurality of slots, at least one pair of main windings positioned in slots to form at least two primary magnetic running poles, said main windings being inductively coupled in the slots of the magnetic core, one of the main windings of said pair of poles producing one instantaneous polarity of said primary magnetic running poles and the other main winding producing the opposite instantaneous polarity of said primary magnetic running poles, said main windings comprising a number of bifilar wound coils, means electrically joining one end of one main winding in circuit with one end of the other main winding for providing a tap connection and including leads brought out from the other ends of said main windings in order to alternately energize the main winding through said tap connection thereby to cause the polarity of said primary magnetic running poles to alternate with said main windings alternately operating as a primary winding and a secondary winding to produce a voltage across said leads greater than the voltage of the source.

2. The alternating current motor of claim 1 wherein said semiconductor switching network includes commutating means, with said main windings being connected in circuit with said commutating means.

3. In a two phase induction motor for operation from a semiconductor switching network energized from a direct current source for supplying current to the two phase induction motor in predetermined time-phase relation, a magnetic core having a plurality of slots, a first pair of phase windings positioned in slots and forming a first pair of primary magnetic poles, one of said phase windings of said first pair producing one instantaneous polarity of the first pair of primary magnetic poles and the other of said windings producing the opposite instantaneous polarity of said first pair of primary magnetic poles, a second pair of phase windings positioned in slots and displaced electrically ninety degrees from said first pair of phase windings, one of said phase windings of the second pair producing one instantaneous polarity of said second pair of primary magnetic poles and the other phase winding of said second pair producing the opposite instantaneous polarity of the second pair of poles, each of said first and second pairs of phase windings including a tap connection joining each pair of phase windings in autotransformer relation in the slots of said core, each of said pairs of phase windings having a pair of leads brought out therefrom for connection with the semiconductor switching network for establishing a charge thereon of a magnitude substantially greater than the direct current source, the phase windings of each pair thereby being alternately energized through said tap connection and thereby causing the polarity of the first and second pairs of primary magnetic poles to alternate in predetermined time-phase relation to operate the motor, with the phase windings of each of said first and second pairs alternately operating as a primary winding and a secondary winding to produce a voltage across each pairs of leads that is greater than the voltage of the source.

4. The two phase induction motor of claim 3 wherein said semiconductor switching network includes commutating means connected in circuit with said pairs of leads brought out from each said pair of phase windings.

5. In a polyphase induction motor for operation from a semiconductor switching network energized from a direct current source for supplying current thereto at a first voltage level in predetermined time-phase relation, a magnetic core having a plurality of slots, a plurality of pairs of phase windings positioned in slots to form a predetermined number of pairs of primary magnetic running poles, one phase winding of each pair of phase windings producing one instantaneous polarity for its associated pair of primary magnetic running poles and the other phase winding producing the opposite instantaneous polarity, the two phase windings of each pair being inductively coupled in the same slots of said magnetic core, each of said pairs of phase windings including a tap connection electrically joining one end of one phase winding with one end of the other phase winding in autotransformer relation having the other ends of the phase windings brought out for connection with the semiconductor switching network thereby to supply current at a second voltage level so that the phase windings of each pair are alternately energized through the tap connection to cause the polarity of the magnetic running poles associated therewith to alternate, with said phase windings of each pair alternately operating as a primary winding and a secondary winding to produce by transformer action the second voltage across the other ends of the phase windings greater than the voltage of the source.

6. The polyphase induction motor of claim 5 wherein said semiconductor switching network includes commutating means connected in circuit with the other ends of said phase windings.

7. An alternating current motor for operation from a semiconductor switching network energized from a direct current source, a magnetic core having a plurality of slots, at least a first and a second main winding positioned in slots to form two primary magnetic running poles, said first and second main windings comprising a number of bifilar wound coils, said first main winding producing one instantaneous polarity of said primary magnetic running poles and said second main winding producing the opposite instantaneous polarity of said primary magnetic running poles, and means including a tap connection electrically joining the start lead of the first main winding with the finish lead of the second main winding to place said first and second main windings in autotransformer relation in the slots of said magnetic core, said start lead of said second main winding and said finish lead of said first main winding brought out from said coils for connection in circuit with the semiconductor switching network so that the first and second main windings are alternately energized through said autotransformer connection to cause the polarity of said primary magnetic running poles to alternate and said first and second main windings alternately functioning as primary winding to provide a step-up in the voltage across said first and second main windings.

8. The alternating current motor of claim 7 wherein said semiconductor switching network includes first commutating means connected in circuit with said finish lead of said first main winding and second commutating means connected in circuit with said start lead of said second main winding.

References Cited

UNITED STATES PATENTS

| 2,703,859 | 3/1955 | Hutchins | 318—220.1 |
| 2,864,986 | 12/1958 | Hutchins | 318—220.1 |
| 2,995,690 | 9/1961 | Lemon | 318—138 |
| 3,098,958 | 7/1963 | Katz | 318—138 |
| 3,207,968 | 9/1965 | King | 318—223 |

ORIS L. RADER, *Primary Examiner.*

G. FRIEDBERG, G. A. RUBINSON,
*Assistant Examiners.*